US012608880B2

(12) United States Patent
Jeon et al.

(10) Patent No.: US 12,608,880 B2
(45) Date of Patent: Apr. 21, 2026

(54) VIEW EXTRAPOLATION METHOD USING EPIPOLAR PLANE IMAGE

(71) Applicant: GIST (Gwangju Institute of Science and Technology), Gwangju (KR)

(72) Inventors: Hae-Gon Jeon, Gwangju (KR); Hyunjun Jung, Gwangju (KR)

(73) Assignee: GIST (Gwangju Institute of Science and Technology), Gwangju (KR)

( * ) Notice: Subject to any disclaimer, the term of this patent is extended or adjusted under 35 U.S.C. 154(b) by 538 days.

(21) Appl. No.: 18/161,780

(22) Filed: Jan. 30, 2023

(65) Prior Publication Data

US 2023/0267572 A1    Aug. 24, 2023

(30) Foreign Application Priority Data

Feb. 18, 2022    (KR) ........................ 10-2022-0021512

(51) Int. Cl.
| | |
|---|---|
| *G06T 15/20* | (2011.01) |
| *G06N 3/0475* | (2023.01) |
| *G06T 3/18* | (2024.01) |
| *G06T 3/4046* | (2024.01) |
| *G06T 3/4053* | (2024.01) |

(Continued)

(52) U.S. Cl.
CPC ......... *G06T 15/205* (2013.01); *G06N 3/0475* (2023.01); *G06T 3/18* (2024.01); *G06T 3/4046* (2013.01); *G06T 3/4053* (2013.01); *G06T 5/77* (2024.01); *G06T 7/557* (2017.01);

(Continued)

(58) Field of Classification Search
CPC ......... G06T 15/205; G06T 2207/20228; G06T 2207/10052; G06T 7/557; G06T 3/18;

G06T 3/40; G06T 3/4007; G06T 3/4046; G06T 3/4053; G06T 3/4069; G06T 2207/20081; G06T 2207/20084; G06T 5/77; G06N 3/02–0985

See application file for complete search history.

(56) References Cited

U.S. PATENT DOCUMENTS

| | | | |
|---|---|---|---|
| 2018/0342075 A1* | 11/2018 | Wang | H04N 13/139 |
| 2023/0106939 A1* | 4/2023 | Yuan | G06T 3/4046 |
| | | | 382/154 |

OTHER PUBLICATIONS

Wu, Gaochang, et al. "Light field reconstruction using convolutional network on EPI and extended applications." IEEE transactions on pattern analysis and machine intelligence 41.7 (2018): 1681-1694. (Year: 2018).*

(Continued)

*Primary Examiner* — Geoffrey E Summers
(74) *Attorney, Agent, or Firm* — Studebaker Brackett PLLC

(57) ABSTRACT

The present disclosure relates to a method of inferring an epipolar plane image and extrapolating a view of a target image using the epipolar plane image. A view extrapolation method using an epipolar plane image according to an embodiment of the present disclosure includes: creating an Epipolar Plane Image (EPI) using a target image and a depth map corresponding to the target image; creating a super-resolution EPI and a disparity of the EPI on the basis of the EPI; creating an EPI mask by warping the super-resolution EPI in accordance with the disparity; and creating a restored EPI by applying the EPI mask to the warped super-resolution EPI, and creating an extrapolated image for the target image using the restored EPI.

9 Claims, 14 Drawing Sheets
(13 of 14 Drawing Sheet(s) Filed in Color)

(51) Int. Cl.
   *G06T 5/77* (2024.01)
   *G06T 7/557* (2017.01)
(52) U.S. Cl.
   CPC .............. *G06T 2207/10052* (2013.01); *G06T 2207/20084* (2013.01); *G06T 2207/20228* (2013.01)

(56) References Cited

OTHER PUBLICATIONS

Wu, Gaochang, et al. "Light field image processing: An overview." IEEE Journal of Selected Topics in Signal Processing 11.7 (2017): 926-954. (Year: 2017).*

Tam, Wa James, et al. "Smoothing depth maps for improved steroscopic image quality." Three-Dimensional TV, Video, and Display III. vol. 5599. SPIE, 2004. (Year: 2004).*

Lv, Huijin, et al. "Light field depth estimation exploiting linear structure in EPI." 2015 IEEE International Conference on Multimedia & Expo Workshops (ICMEW). IEEE, 2015. (Year: 2015).*

Ding, Yuyang, et al. "Rain streak removal from light field images." IEEE Transactions on Circuits and Systems for Video Technology 32.2 (2021): 467-482. (Year: 2021).*

Elharrouss, Omar, et al. "Image inpainting: A review." Neural Processing Letters 51 (2020): 2007-2028. (Year: 2019).*

Tran, Trung-Hieu, Jan Berberich, and Sven Simon. "3DVSR: 3D EPI vol. based Approach for Angular and Spatial Light field Image Super-resolution." arXiv preprint arXiv:2201.01294v1 (2022). (Year: 2022).*

Wanner, Sven, and Bastian Goldluecke. "Variational light field analysis for disparity estimation and super-resolution." IEEE transactions on pattern analysis and machine intelligence 36.3 (2013): 606-619. (Year: 2013).*

Changha Shin et al., "EPINET: A Fully-Convolutional Neural Network Using Epipolar Geometry for Depth from Light Field Images", Computer Vision and Pattern Recognition, Apr. 6, 2018, total 10 pages, doi: arxiv.org/abs/1804.02379v1 [cs.CV].

Jinglei Shi et al., "Learning Fused Pixel and Feature-based View Reconstructions for Light Fields", Proceedings of the IEEE/CVF Conference on Computer Vision and Pattern Recognition(CVPR), (2020), date of conference: Jun. 13-19, 2020, pp. 2552-2561, IEEE.

An Office Action mailed by the Korean Intellectual Property Office on Jun. 20, 2023, which corresponds to Korean Patent Application No. 10-2022-0021512 and is related to U.S. Appl. No. 18/161,780.

A Notice of Allowance mailed by the Korean Intellectual Property Office on Jul. 19, 2023, which corresponds to Korean Patent Application No. 10-2022-0021512 and is related to U.S. Appl. No. 18/161,780.

* cited by examiner

EPI

SR network

Super-resolved
EPI

Structure
tensor

Disparity

**Feature
extraction**

Disp. network

2D convolution layer    Channel-wise concatenation ⓒ

Epipolar plane images (EPIs)

LF stack

Sub-aperture images

Two-plane light field (LF)

Super-resolved EPI

Warped EPI

Masked EPI

Disparity

Warping operation (proposed)

Unreliability mask w Warping operation on EPI

* Element-wise multiplication 2D convolution layer

VIEW EXTRAPOLATION METHOD USING EPIPOLAR PLANE IMAGE

CROSS REFERENCE TO RELATED APPLICATION

The present application claims priority to Korean Patent Application No. 10-2022-0021512, filed Feb. 18, 2022, the entire contents of which is incorporated herein for all purposes by this reference.

BACKGROUND OF THE INVENTION

Field of the Invention

The present disclosure relates to a method of inferring an epipolar plane image for a target image and extrapolating a view of a target image using the epipolar plane image.

Description of the Related Art

As deep learning is combined with the computer vision field, it is possible to extract various features of images or improve the images using the extracted features. For example, it is possible to extract depth information of an object included in an image and it is possible to increase the resolution of an image by interpolating values between pixels in an image.

Further, recently, a study of image extrapolation that estimates an image at another view on the basis of an image taken at a specific view is conducted.

SUMMARY OF THE INVENTION

An objective of the present disclosure is to simultaneously perform super-resolution of a target image, disparity estimation, and view extrapolation operation using an epipolar plane image.

The objectives of the present disclosure are not limited to those described above and other objectives and advantages not stated herein may be understood through the following description and may be clear by embodiments of the present disclosure. Further, it would be easily known that the objectives and advantages of the present disclosure may be achieved by the configurations described in claims and combinations thereof.

In order to achieve the objectives described above, a viewpoint extrapolation method using an epipolar plane image according to an embodiment of the present disclosure includes: creating an Epipolar Plane Image (EPI) using a target image and a depth map corresponding to the target image; creating a super-resolution EPI and a disparity of the EPI on the basis of the EPI; creating an EPI mask by warping the super-resolution EPI in accordance with the disparity; and creating a restored EPI by applying the EPI mask to the warped super-resolution EPI, and creating an extrapolated image for the target image using the restored EPI.

In an embodiment, the creating of an EPI includes: receiving the target image taken at a first viewpoint and a reference image taken at a second viewpoint; and creating a depth map corresponding to the target image on the basis of the target image and the reference image.

In an embodiment, the creating of an EPI includes creating the EPI by applying Gaussian blur to the depth map.

In an embodiment, the creating of an EPI includes creating a plurality of sub-aperture images through warping according to the depth map, and creating the EPI from the plurality to sub-aperture images.

In an embodiment, the creating of a disparity includes creating the disparity on the basis of an inclination of the EPI.

In an embodiment, the warping of the super-resolution EPI includes warping pixels of each of lines constituting the super-resolution EPI in accordance with the disparity of each of the lines.

In an embodiment, the warping of the super-resolution EPI includes: determining a pixel value of a first line of the super-resolution EPI as a pixel value of a first line of the warped super-resolution EPI; and determining the warped super-resolution EPI by propagating pixel values of each of lines of the warped super-resolution EPI to next lines in accordance with the disparity of each of the lines.

In an embodiment, the creating of an EPI mask includes creating an EPI mask of which the value is determined by a coordinate of a pixel that is propagated in accordance with the disparity when the super-resolution EPI is warped.

In an embodiment, the creating of an EPI mask includes creating a binary EPI mask in which the value of a coordinate of a pixel that is propagated in accordance with the disparity is 1 and values of coordinates of the other pixels are 0.

In an embodiment, the creating of a restored EPI includes: creating a masked EPI by performing element-wise multiplication on the EPI mask and the warped super-resolution EPI; and creating the restored EPI by restoring the masked EPI.

In an embodiment, the creating of a restored EPI includes creating the restored EPI by inputting the masked EPI to a Generative Adversarial Network (GAN).

In an embodiment, the creating of an extrapolated image includes: creating a plurality of sub-aperture images using the restored EPI; and determining any one of the plurality of sub-aperture images as the extrapolated image.

The present disclosure has an advantage that the present disclosure can be widely used in the field of computer vision and image processing by simultaneously performing super-resolution, disparity estimation, and viewpoint extrapolation of a target image using an epipolar plane image through one neural network architecture.

Detailed effects of the present disclosure in addition to the above effects will be described with the following detailed description for accomplishing the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings of this specification exemplify preferred embodiments and help easy understanding of the present invention together with the following detailed description, so the present invention should not be construed as being limited to the drawings.

DETAILED DESCRIPTION OF THE INVENTION

Figure 1:
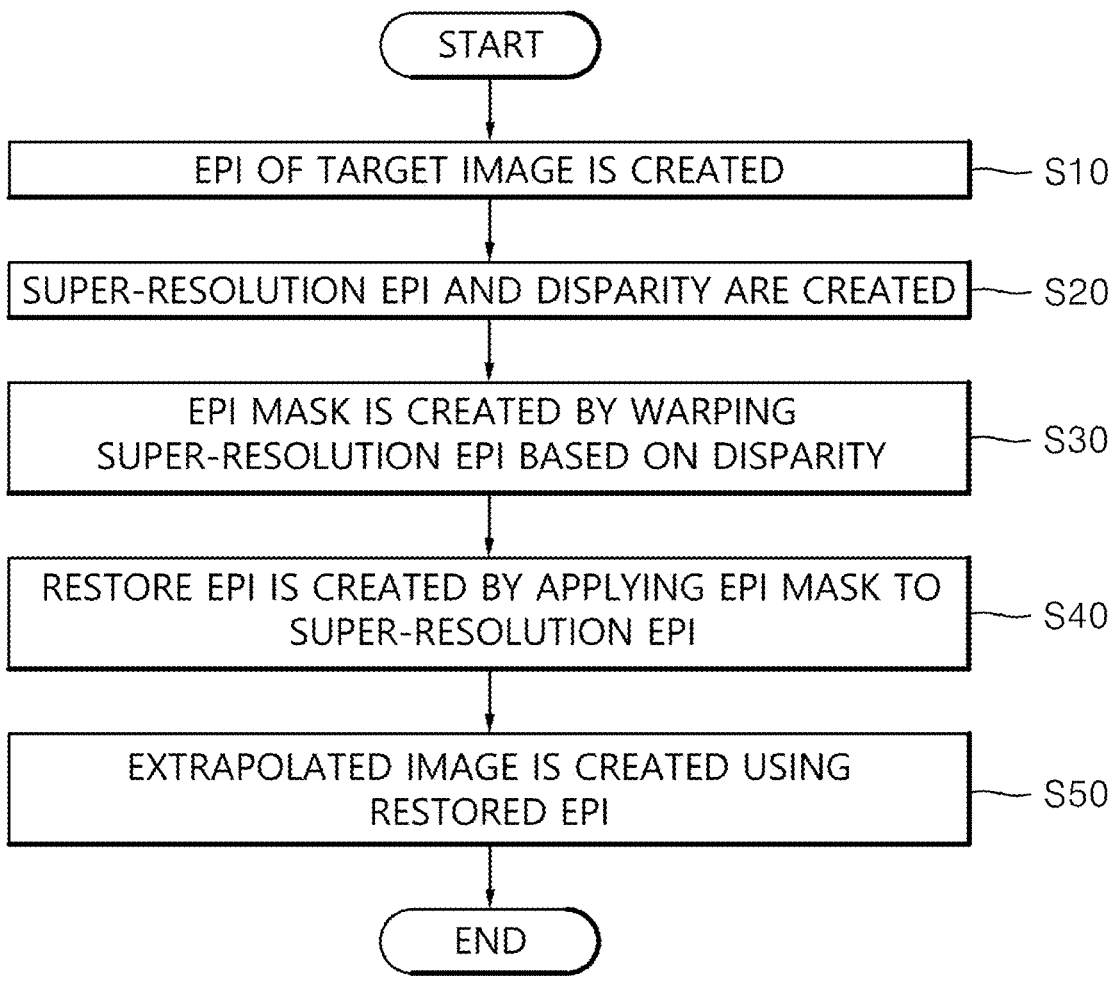
FIG. 1 is a flowchart showing a view extrapolation method using an epipolar plane image (EPI) according to an embodiment of the present disclosure.

The objects, characteristics, and advantages will be described in detail below with reference to the accompanying drawings, so those skilled in the art may easily achieve the spirit of the present disclosure. However, in describing the present disclosure, detailed descriptions of well-known technologies will be omitted so as not to obscure the description of the present disclosure with unnecessary details. Hereinafter, exemplary embodiments of the present invention will be described with reference to accompanying drawings. The same reference numerals are used to indicate the same or similar components in the drawings.

Although terms 'first', 'second', etc. are used to describe various components in the specification, it should be noted that these components are not limited by the terms. These terms are used to discriminate one component from another component and it is apparent that a first component may be a second component unless specifically stated otherwise.

Further, when a certain configuration is disposed "over (or under)" or "on (beneath)" of a component in the specification, it may mean not only that the certain configuration is disposed on the top (or bottom) of the component, but that another configuration may be interposed between the component and the certain configuration disposed on (or beneath) the component.

Further, when a certain component is "connected", "coupled", or "jointed" to another component in the specification, it should be understood that the components may be directly connected or jointed to each other, but another component may be "interposed" between the components or the components may be "connected", "coupled", or "jointed" through another component.

Further, singular forms that are used in this specification are intended to include plural forms unless the context clearly indicates otherwise. In the specification, terms "configured", "include", or the like should not be construed as necessarily including several components or several steps described herein, in which some of the components or steps may not be included or additional components or steps may be further included.

Further, the term "A and/or B" stated in the specification means that A, B, or A and B unless specifically stated otherwise, and the term "C to D" means that C or more and D or less unless specifically stated otherwise.

The present disclosure relates to a method of inferring an epipolar plane image for a target image and extrapolating a view of a target image using the epipolar plane image. Hereafter, a view extrapolation method using an Epipolar Plane Image (EPI) according to an embodiment of the present disclosure is described with reference to FIGS. 1 to 12.

FIG. 1 is a flowchart showing a view extrapolation method using an epipolar plane image (EPI) according to an embodiment of the present disclosure.

Figure 2A:
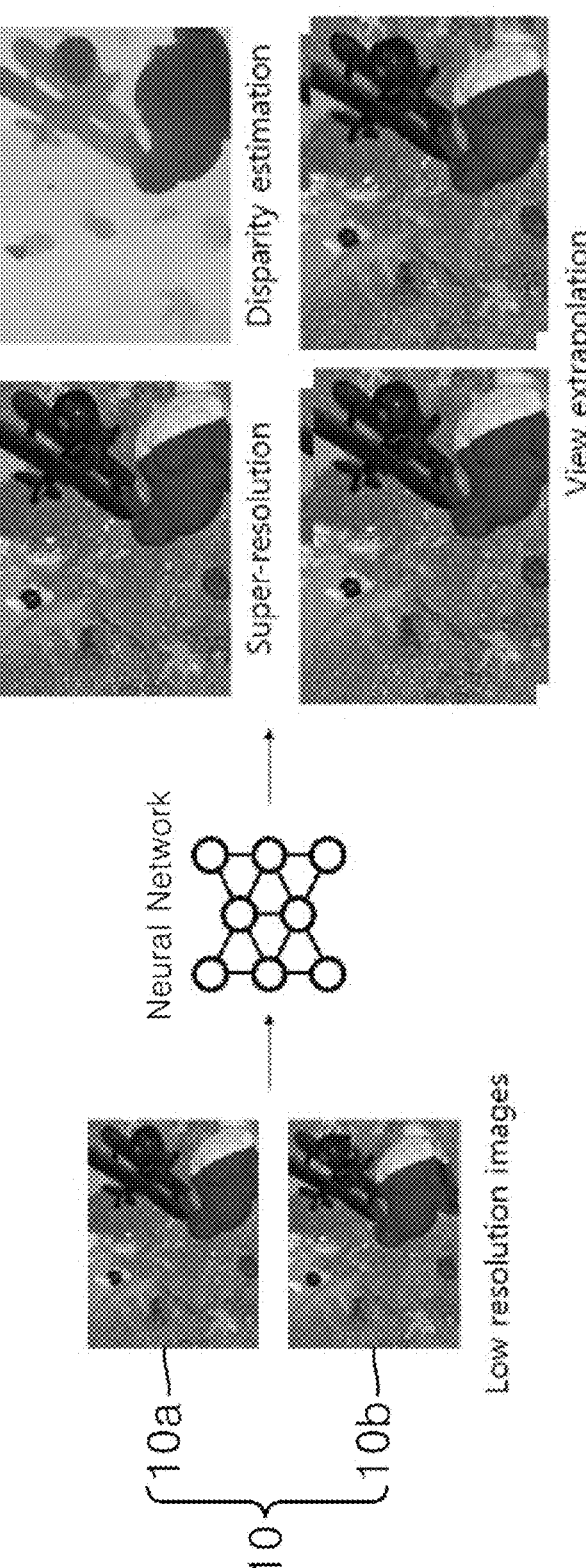
FIGS. 2A and 2B are view showing data that are input/output to perform end-to-end learning on a neural network of the present disclosure.
Figure 2B:
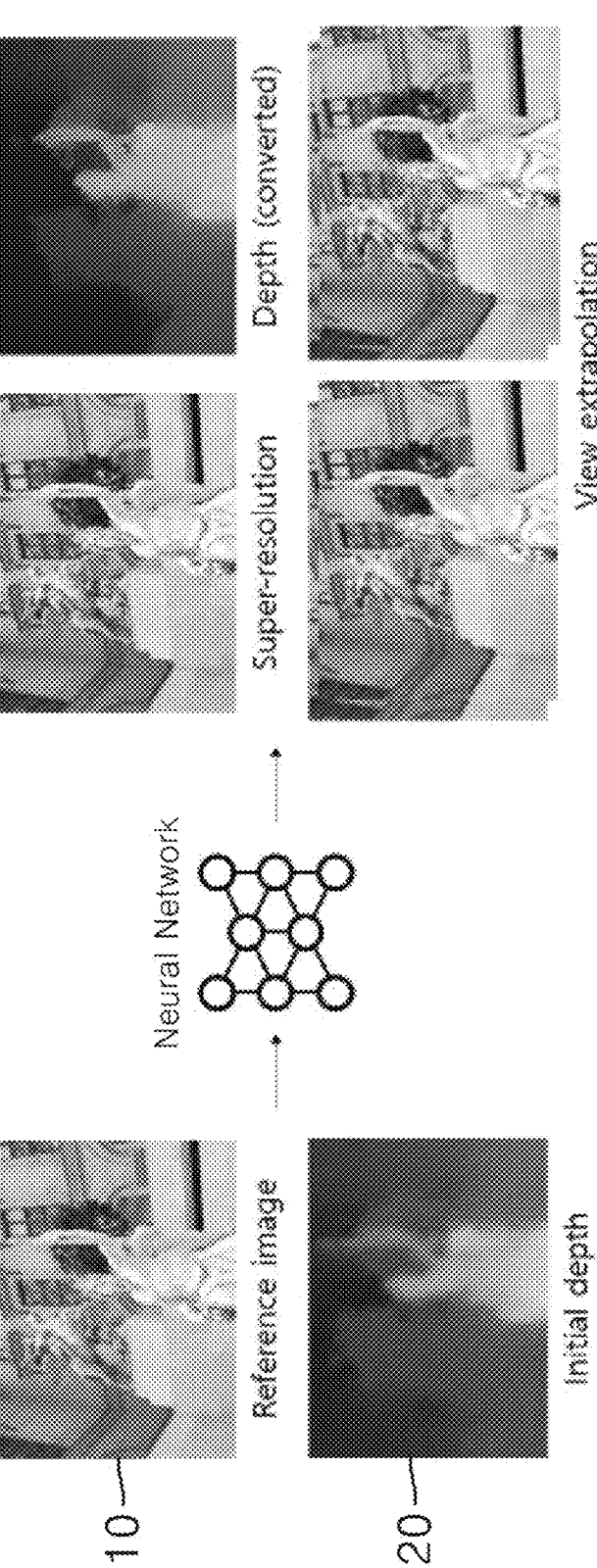

FIGS. 2A and 2B are view showing data that are input/output to perform end-to-end learning on a neural network of the present disclosure.

Figure 3:
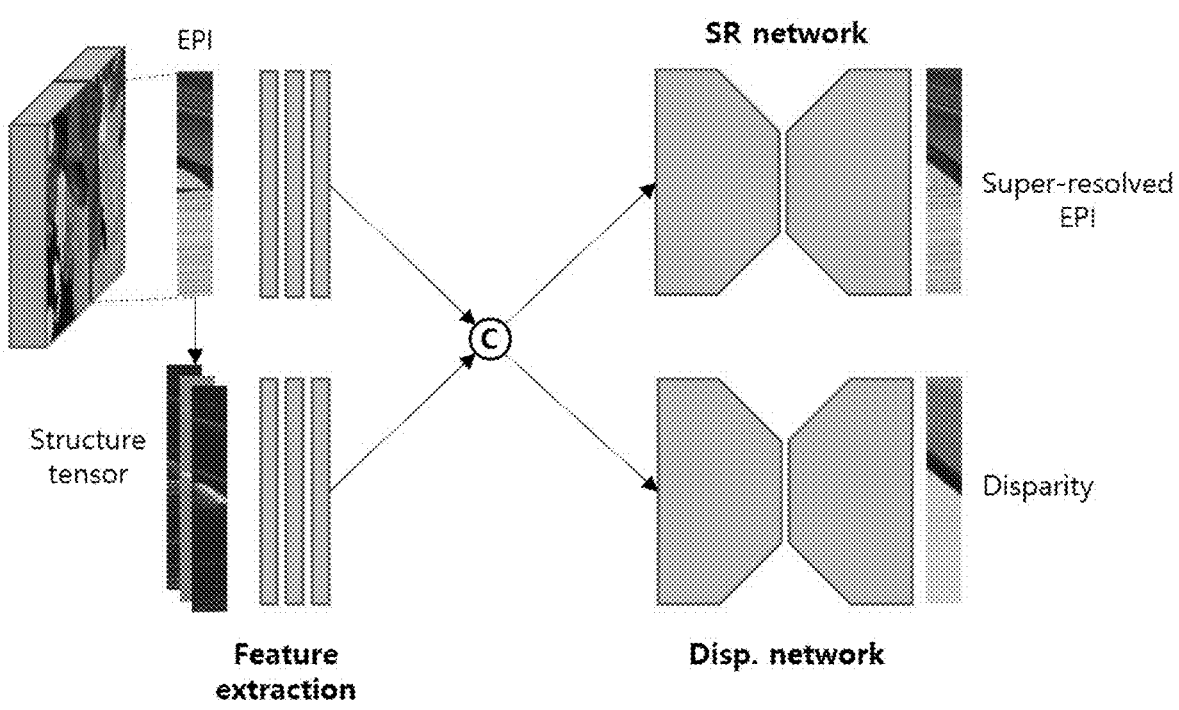
FIG. 3 is a view illustrating an EPI.
Figure 4A:
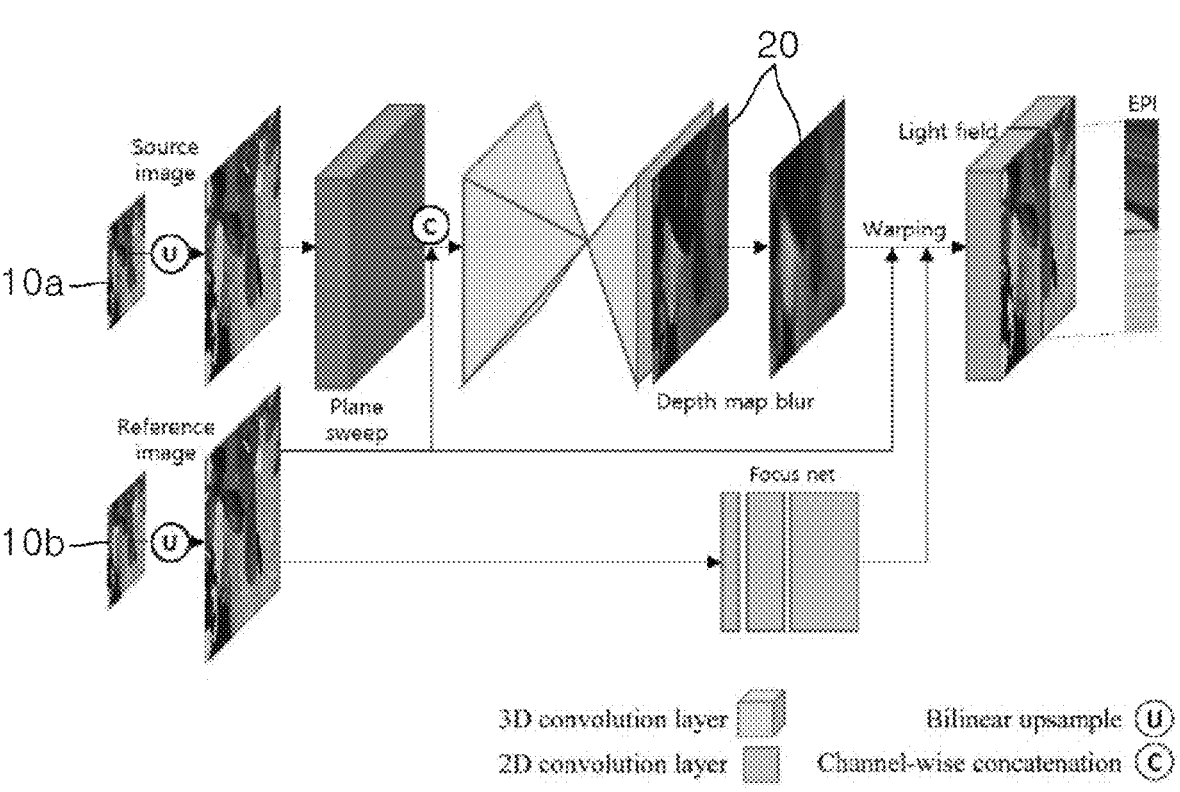
FIGS. 4A and 4B are views showing an architecture for creating an EPI from a target image.
Figure 4B:
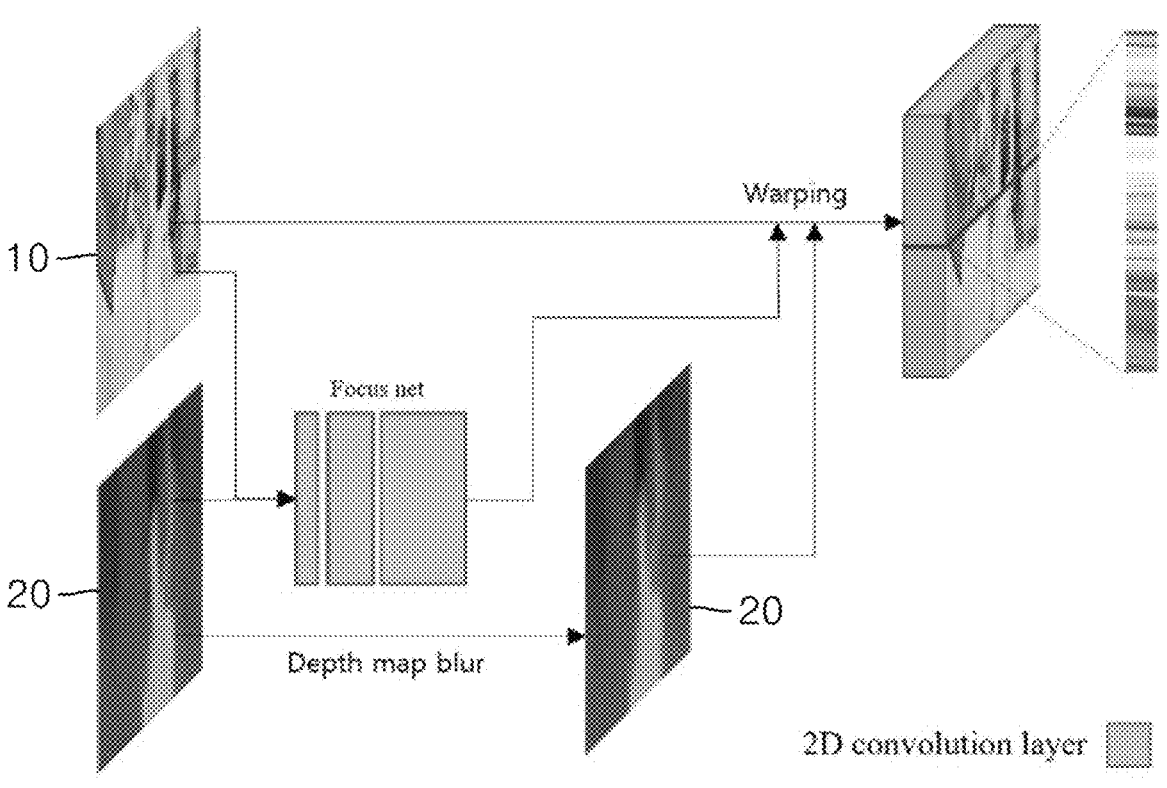

FIG. 3 is a view illustrating an EPI and FIGS. 4A and 4B are views showing an architecture for creating an EPI from a target image.

Figure 5:
FIG. 5 is a view showing a disparity recognized from an EPI.
Figure 6:
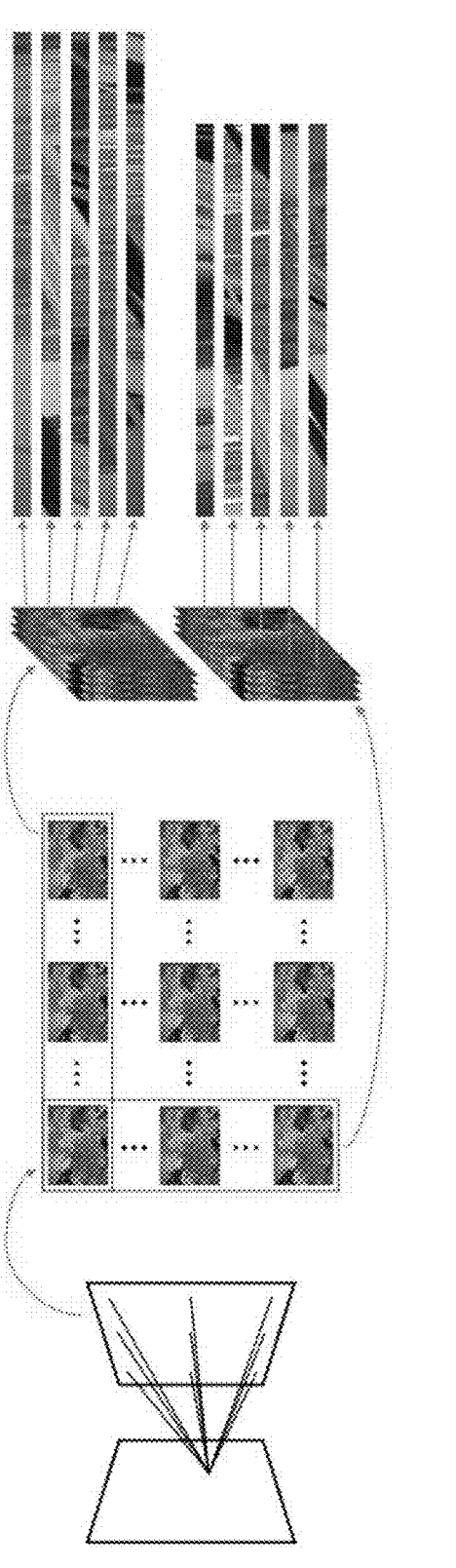
FIG. 6 is a view showing an architecture for creating a super-resolution EPI and a disparity from an EPI.

FIG. 5 is a view showing disparity recognized from an EPI and FIG. 6 is a view showing an architecture for creating a super-resolution EPI and a disparity from an EPI.

Figure 7:
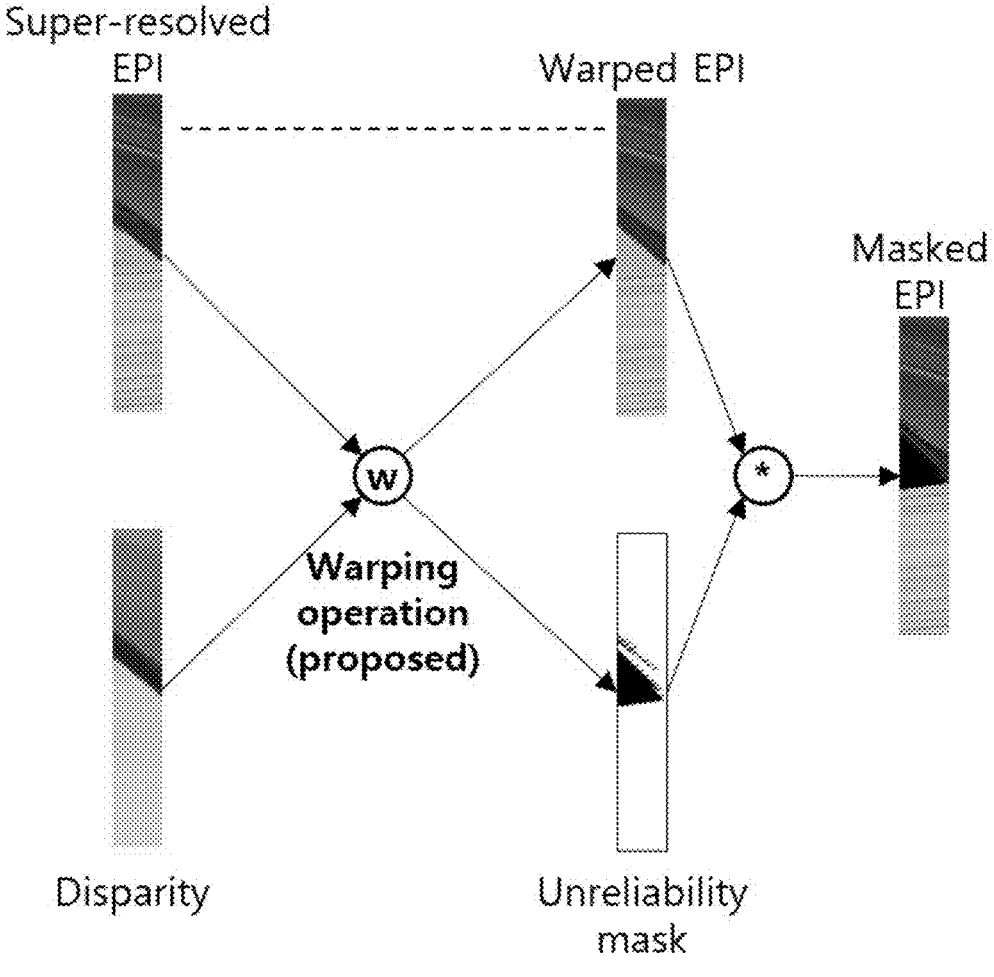
FIG. 7 is a view showing a process of creating a super-resolution EPI, which is warped from a super-resolution EPI and a disparity, and an EPI mask, and creating an masked EPI by applying the EPI mask to the warped super-resolution EPI.
Figure 8:
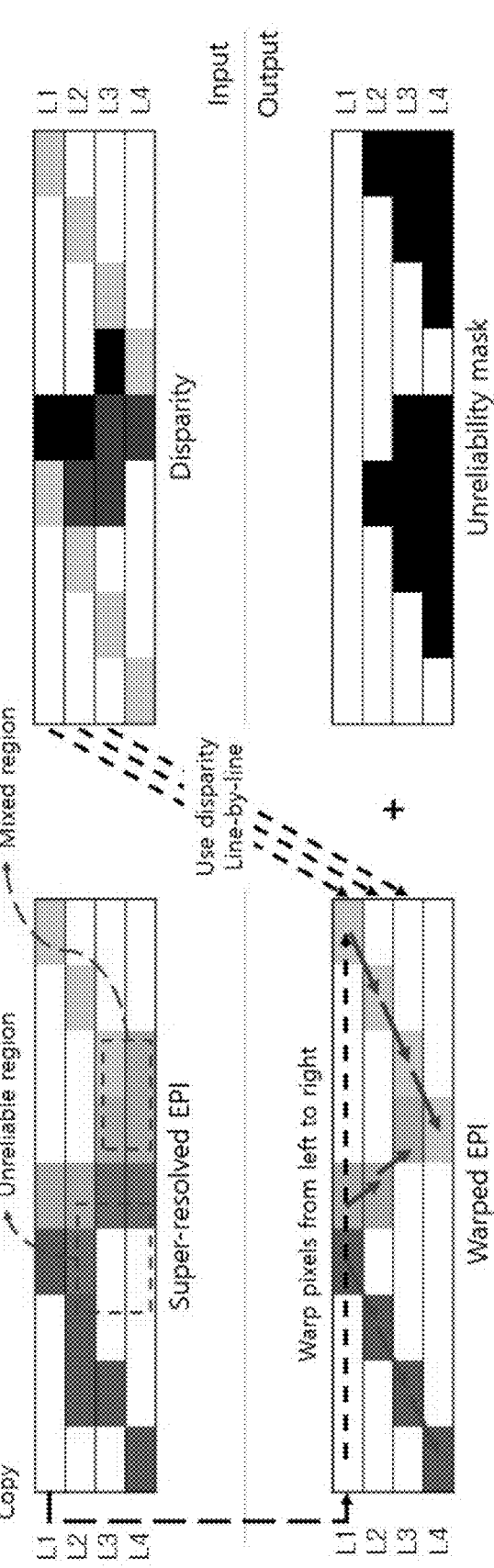
FIG. 8 is a view illustrating a process of warping a super-resolution EPI in accordance with a disparity.

FIG. 7 is a view showing a process of creating a super-resolution EPI, which is warped from a super-resolution EPI and a disparity, and an EPI mask, and creating an masked EPI by applying the EPI mask to the warped super-resolution EPI. Further, FIG. 8 is a view illustrating a process of warping a super-resolution EPI in accordance with a disparity.

Figure 9:
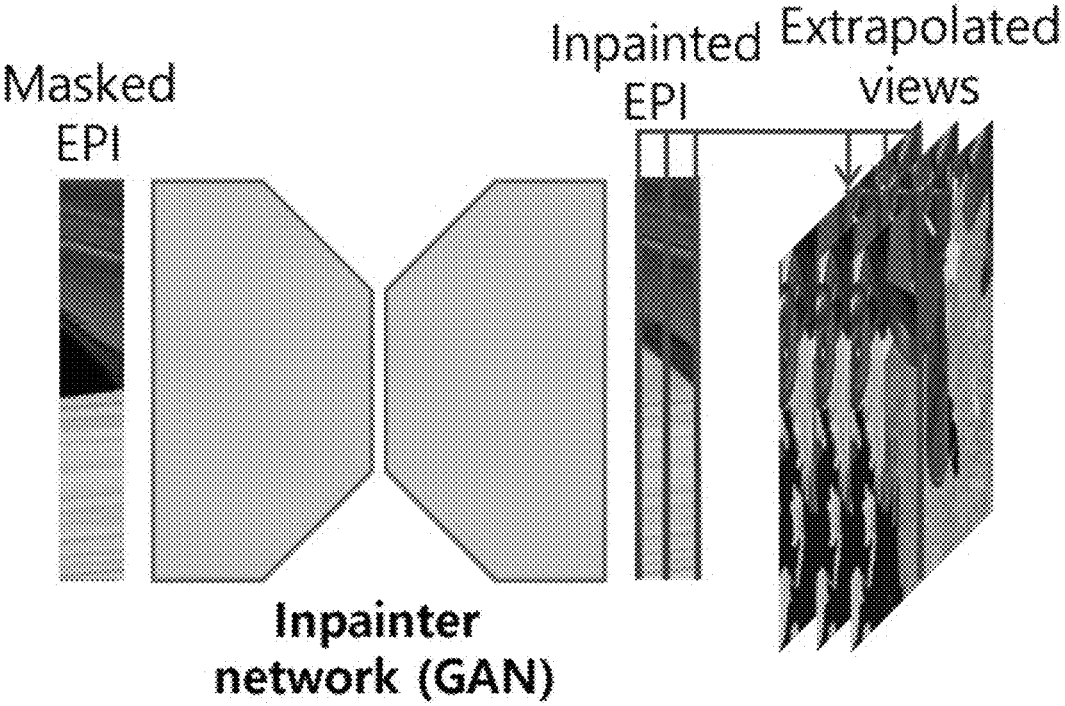
FIG. 9 is a view showing an architecture for creating a restored EPI from a masked EPI and creating an extrapolation image using the restored EPI.

FIG. 9 is a view showing an architecture for creating a restored EPI from a masked EPI and creating an extrapolation image using the restored EPI.

Figure 10:
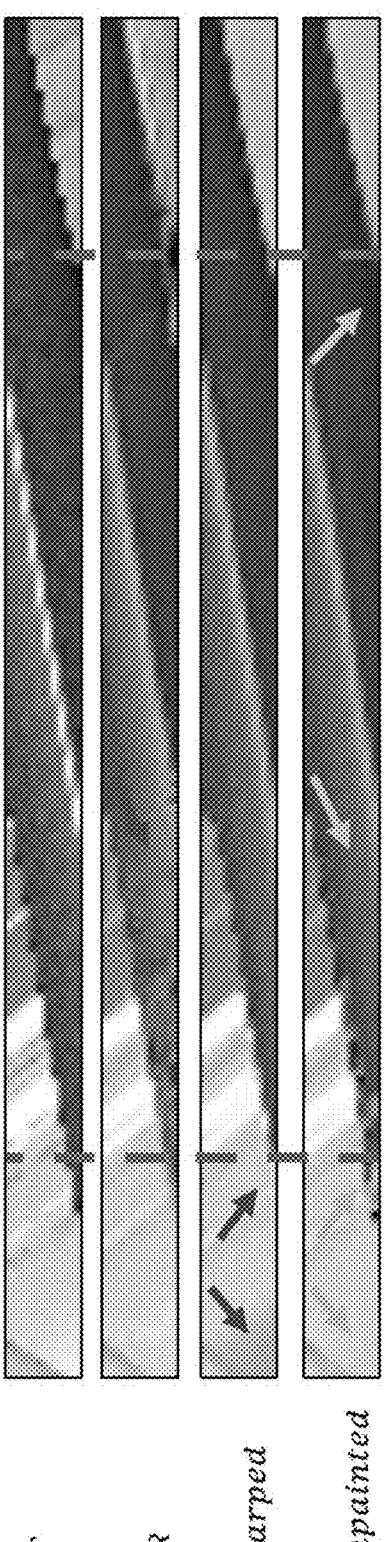
FIG. 10 is a view sequentially showing an EPI that is restored in accordance with the operation of the present disclosure.
Figure 11:
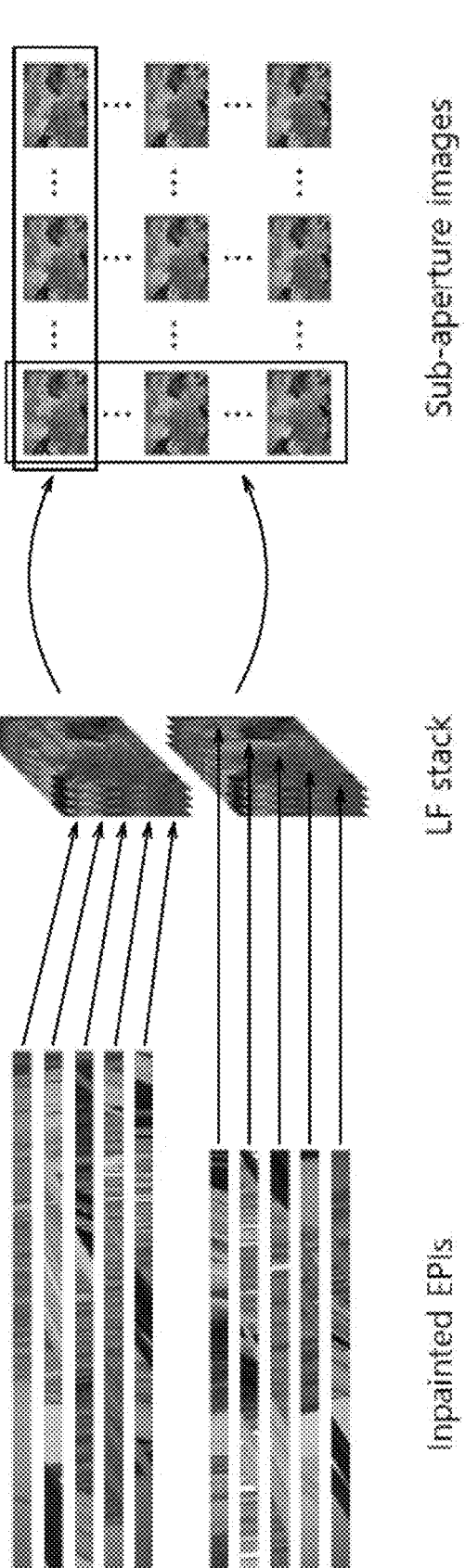
FIG. 11 is a view showing that sub-aperture images are created using a restored EPI.

FIG. 10 is a view sequentially showing an EPI that is restored in accordance with the operation of the present disclosure and FIG. 11 is a view showing that sub-aperture images are created using a restored EPI.

Figure 12:
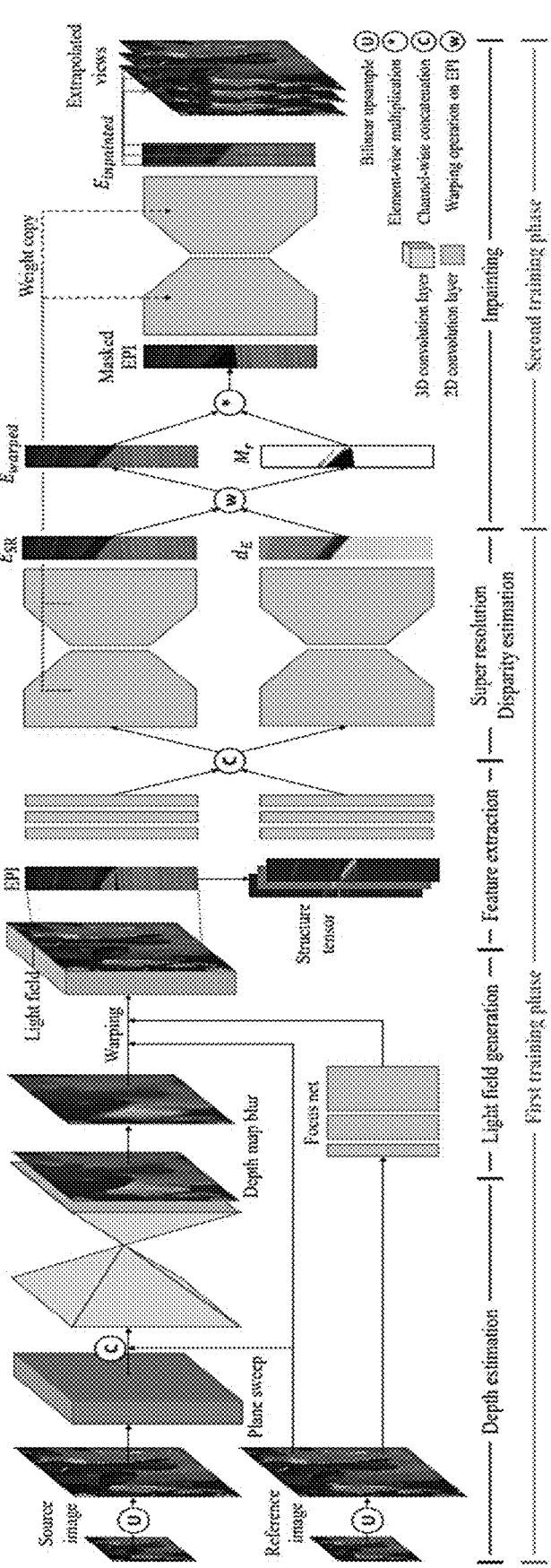
FIG. 12 is a view exemplarily showing the entire neural network architecture that is applied to the present disclosure.

FIG. 12 is a view exemplarily showing the entire neural network architecture that is applied to the present disclosure.

Referring to FIG. 1, a view extrapolation method using an epipolar plane image (EPI) (hereafter, view extrapolation method) according to an embodiment of the present disclosure may include creating an EPI of a target image 9S10), creating a super-resolution EPI and a disparity (S20), creating an EPI mask by warping the super-resolution EPI on the basis of the disparity (S30), creating a restored EPI by applying the EPI mask to the super-resolution EPI (S40), and creating an extrapolated image using the restored EPI (S50).

However, the view extrapolation method shown in FIG. 1 is based on an embodiment, the steps of the present disclosure are not limited to the embodiment shown in FIG. 1, and if necessary, some components may be added, changed, or removed.

The steps shown in FIG. 1 may be performed by a processor that train and operates a deep learning neural network, and the processor, in order to perform operations to be described below, may include at least one physical element of application specific integrated circuits (ASICs), digital signal processors (DSPs), digital signal processing devices (DSPDs), programmable logic devices (PLDs), field programmable gate arrays (FPGAs), a controller, and micro-controllers.

Referring to FIGS. 2A and 2B, a neural network that is applied to the present disclosure may be trained in an end-to-end type. A training dataset for training may be composed of an input dataset and an output dataset, and the input dataset may be target images 10 (10*a* and 10*b*) taken at two views or the target images 10 and a depth map 20 corresponding to the target images 10. Meanwhile, the output data may include a super-resolution image, a disparity, and an extrapolation image for the target image 10.

Accordingly, the neural network that is applied to the present disclosure can simultaneously perform super-resolution, disparity estimation, and view extrapolation of the target image 10. To this end, the neural network of the present disclosure may include a plurality of architectures that perform their operations, respectively, and the processor, as will be described below, can train or operate the architectures.

Hereafter, the steps shown in FIG. 1 are described in detail.

The processor can create an EPI using a target image and a depth image 20 corresponding to the target image (S10).

Referring to FIG. 3, an EPI may be defined as an image that is created by stacking a plurality of sub-aperture images, which are created in accordance with a relative view difference of at least two planes, in accordance with each light field, and then cutting the sub-aperture images in any one axial direction.

The EPI, as shown in FIG. 3, may be created from a plurality of sub-aperture images, and the processor can create an EPI using a target image 10 and a depth map 20 corresponding to the target image 10 instead of sub-aperture images. The depth map 20 may be created using the target image 10 or may be collected from the outside together with the target image 10.

In an embodiment, the processor can receive a target image 10 taken at a first view and a reference image 10r taken at a second view. The processor can create the depth map 20 corresponding to the target image 10 on the basis of the target image 10 and the reference image 10r and can create an EPI from the depth image 20.

Referring to FIG. 4A, in detail, the processor can upsample the target image 10 and the reference image 10r through bilinear interpolation. Next, the processor can expand the channel of the target image 10 upsampled through plane sweeping, can connect the channel to the reference image 10r (channel-wise concatenation), and then can create the depth map 20 of the target image 10 through a 2D convolution layer.

When the depth map 20 is created, the processor can create an EPI through warping according to the depth map 20. The warping may mean an operation of creating a sub-aperture image for the target image 10 in accordance with depth information of each of pixels constituting the depth map 20.

Referring to FIG. 4A again, the processor can create a plurality of stacked sub-aperture images of the target image 10 by warping the reference image in accordance with the created depth map 20, and can create an EPI by axially cutting the sub-aperture images.

Referring to FIG. 4B, unlike the above description, when a target image 10 and a depth map 20 are both provide, the processor can create a plurality of stacked sub-aperture images by warping the target image 10 in accordance with the depth map 20, and can create an EPI by axially cutting the stacked sub-aperture images.

Meanwhile, when performing warping according to the depth map 20, the processor can apply Gaussian blur to the depth map 20 to attenuate noise of the depth map 20. In detail, as shown in FIGS. 4A and 4B, the processor can apply Gaussian blur to an estimated or given depth map 20, whereby the pixel values of the depth map 20 can be adjusted to be uniform.

When an EPI is created, the processor can create a super-resolution EPI and the disparity of the EPI on the basis of the EPI (S20). In this case, the disparity may be a certain parameter showing the parallax between sub-aperture images.

Referring to FIG. 5, a specific point in a target image 10 may have different locations in sub-aperture images. Accordingly, a straight line connecting specific points in an EPI may have an inclination and the processor can create a disparity on the basis of the inclination of the EPI.

Together with creating the disparity, the processor can perform super-resolution on the EPI, and to this end, nearest neighbor, bilinear, and bicubic interpolations may be used. Further, the processor can perform super-resolution on the EPI using a convolution neural network.

Referring to FIG. 6, the processor can recognize inclination information of an EPI by applying a structure tensor to the EPI, and can extract features from the EPI and the recognized inclination information. Next, the processor can connect the extracted features for each channel (channel-wise concatenation) and can input the extracted features to two 2D convolution neural network, respectively, and the convolution neural networks each can output a super-resolution EPI and a disparity.

When a super-resolution EPI and a disparity are created in accordance with the process described above, the processor can create an EPI mask by warping the super-resolution EPI in accordance with the disparity (S30).

A super-resolution EPI is fundamentally output on the basis of an EPI with a low resolution, so it may include distortion, and the processor can warp the super-resolution EPI in accordance with a disparity to attenuate distortion.

Referring to FIG. 7, the processor can simultaneously create a warped super-resolution EPI and an EPI mask by warping a super-resolution EPI in accordance with a disparity. Hereafter, the process of warping a super-resolution EPI and the process of creating an EPI mask are described with reference to FIG. 8. Meanwhile, the colors of the super-resolution EPI and the disparity shown in FIG. 8 should be understood as representing pixel values.

Referring to FIG. 8, the super-resolution EPI and the disparity may have lines corresponding to the number of stacked sub-aperture images. In this case, the super-resolution EPI may include distortion naturally generated or an unreliable region and/or a mixed region generated by overlapping of objects, and the processor can remove the regions through warping to be described below.

The processor can warp pixels of each of lines constituting a super-resolution EPI in accordance with the disparity of each line. In detail, the processor can create a warped super-resolution EPI (hereafter, warped EPI) by propagating the pixel value of an upper line of a super-resolution EPI to a lower line in accordance with the disparity of each line.

In more detail, the processor can determine the pixel value of the first line of a super-resolution EPI as the pixel value of the first line of a warped super-resolution EPI. Next, the processor can determine a warped EPI by propagating the pixel value for each line of the warped EPI to the next line in accordance with the disparity of each line.

Referring to FIG. 8 again, as for each of lines, the processor can determine the pixel value of L1 of the super-resolution EPI as the pixel value of the L1 of a warped EPI. Next, the processor can recognize the pixel valve moved from L1 to the L2 of the disparity and can propagate the L1 pixel value of the warped EPI to the L2 pixel value in accordance with movement direction of the pixel.

Next, the processor can recognize the pixel valve moved from L2 to the L3 of the disparity and can propagate the L2 pixel value of the warped EPI to the L3 pixel value in accordance with movement direction of the pixel. Next, the processor can recognize the pixel valve moved from L3 to the L4 of the disparity and can propagate the L3 pixel value of the warped EPI to the L4 pixel value in accordance with movement direction of the pixel.

Through this process, the processor can determine a warped EPI and simultaneously create an EPI mask. In detail, when warping a super-resolution EPI, the processor can create an EPI mask of which the value is determined by the coordinate of the pixel that is propagated in accordance with a disparity.

The EPI mask also has lines corresponding to the number of stacked sub-aperture images, and when a pixel value is propagated in accordance with the method described with reference to FIG. 8, the processor can create an EPI mask such that the coordinate of the pixel that is propagated and the coordinate of a pixel that is not propagated have different values.

In an embodiment, the processor can create a binary EPI mask in which the value of the coordinate of a pixel that is propagated in accordance with a disparity is 1 and the values of the coordinates of the other pixels are 0. Referring to FIG. 8 again, when propagating a pixel value of a warped EPI from an upper line to a lower line in accordance with a disparity, the processor can create an EPI mask in which the coordinate of a pixel that is propagated has a value of 1 and the coordinate of the pixel of the lower line that is not propagated has a value of 0.

When a warped EPI and an EPI mask are created in accordance with the method described above, the processor can create a restored EPI by applying the EPI mask to the warped EPI (S40). In detail, the processor can completely remove an unreliable region still included in the warped EPI by applying the EPI mask to the warped EPI, and can create a restored EPI on the basis of the masked EPI.

Referring to FIG. 7 again, the processor can create a masked EPI by applying element-wise multiplication an EPI mask and a warped EPI. Next, the processor can create a restored EPI by restoring the occluded region of the masked EPI.

In the restoration process, the processor can use a Generative Adversarial Network (GAN). In detail, the processor can input the masked EPI to the GAN and the GAN can output a restored EPI.

Referring to FIG. 9, the processor can input the masked EPI to the GAN. The GAN can output a restored EPI having data distribution similar to the actual (Ground Truth (GT)) EPI on the basis of the masked EPI. In this case, super-resolution should also be performed on the restored EPI that is output from the GAN, so the parameters learned by the super-resolution convolution network (SR network) shown in FIG. 6 may be used as some of the parameters that are applied the GAN.

FIG. 10 sequentially shows super-resolved, warped, and restored EPIs in accordance with the processes shown in FIGS. 6 and 9. As can be seen from FIG. 10, a super-resolution EPI may include an overlap region (red arrow), and this overlap area disappears in a warped EPI(, but an unreliable region may still remain in a warped EPI. The unreliable region may disappear when an EPI mask is applied, and the disappearing part may be restored as indicated by a yellow arrow in a restored EPI.

When a restored EPI is created, as described above, the processor can create an extrapolated image for the target image 10 using the restored EPI (S50). In this case, the extrapolated image may be a sub-aperture image having a different view from the target image 10.

The restored EPI includes a super-resolution sub-aperture image restored for the target image 10, so the processor can create a plurality of sub-aperture images on the basis of the restored EPI and can extrapolate the target image 10 on the basis of the sub-aperture images.

In an embodiment, the processor can create a plurality of sub-aperture images using a restored EPI and can determine any one of the sub-aperture images as an extrapolated image.

Referring to FIG. 11, in detail, the processor can create a stacking image corresponding to the number of lines on the basis of the coordinate value of each of lines of the restored EPI. For example, when a restored EPI has four lines, the processor can create stacking images corresponding to four views, respectively.

Next, the processor can create a plurality of sub-aperture images of which views have been moved in axial directions, respectively, by separating the stacking images. The processor can determine any one of the created sub-aperture images, for example, a sub-aperture image corresponding to a specific view selected by a user as an extrapolated image for the target image 10.

FIG. 12 is a view showing an entire neural network architecture that performs the view extrapolation method shown in FIG. 1.

In the entire neural network architecture, a first training phase includes the EPI creation architecture, the super-resolution EPI and disparity creation architecture shown in FIGS. 4A and 6, respectively, and the processor can determine a neural network parameter of the first training phase through end-to-end supervised learning.

Next, the processor freezes the neural network parameter of the first training phase and then applies a Generative Adversarial Network (GAN0 to a second training phase, thereby being able to determine a neural network parameter for creating a restored EPI.

When the neural network parameters of the first and second training phase are determined, the processor can input an input target image 10 and a reference image 10r to the entire neural network architecture, and the neural network architecture can output a super-resolved target image, and an estimated disparity and an extrapolated target image for the target image.

As described above, the present disclosure has an advantage that the present disclosure can be widely used in the field of computer vision and image processing by simultaneously performing super-resolution, disparity estimation, and view extrapolation of a target image 10 using an epipolar plane image through one neural network architecture.

Although the present disclosure was described with reference to the exemplary drawings, it is apparent that the present disclosure is not limited to the embodiments and drawings in the specification and may be modified in various ways by those skilled in the art within the range of the spirit of the present disclosure. Further, even though the operation effects according to the configuration of the present disclosure were not clearly described with the above description of embodiments of the present disclosure, it is apparent that effects that can be expected from the configuration should be also admitted.

What is claimed is:

1. A view extrapolation method using an epipolar plane image, the view extrapolation method comprising:

creating an Epipolar Plane Image (EPI) using a target image and a depth map corresponding to the target image;

creating a super-resolution EPI and a disparity of the EPI on the basis of the EPI;

creating an EPI mask by warping the super-resolution EPI in accordance with the disparity; and creating a restored EPI by applying the EPI mask to the warped super-resolution EPI, and creating an extrapolated image for the target image using the restored EPI, wherein the creating of an EPI mask includes creating an EPI mask of which a value is determined by a coordinate of a pixel that is propagated in accordance with the disparity when the super-resolution EPI is warped, wherein the creating of a restored EPI includes:

creating a masked EPI by performing element-wise multiplication on the EPI mask and the warped super-resolution EPI; and creating the restored EPI by restoring the masked EPI, and wherein the creating of a restored EPI includes creating the restored EPI by inputting the masked EPI to a Generative Adversarial Network (GAN).

2. The view extrapolation method of claim 1, wherein the creating of an EPI comprises:

creating a plurality of stacked sub-aperture images through warping according to the depth map; and creating the EPI from the plurality of stacked sub-aperture images by axially cutting the plurality of stacked sub-aperture images.

3. The view extrapolation method of claim 1, wherein the creating of an EPI includes:

receiving the target image taken at a first view and a reference image taken at a second view; and creating the depth map corresponding to the target image on the basis of the target image and the reference image.

4. The view extrapolation method of claim 1, wherein the creating of an EPI includes creating the EPI by applying Gaussian blur to the depth map.

5. The view extrapolation method of claim 1, wherein the creating of a disparity includes creating the disparity on the basis of an inclination of the EPI.

6. The view extrapolation method of claim 1, wherein the warping of the super-resolution EPI includes warping pixels of each of lines constituting the super-resolution EPI in accordance with the disparity of each of the lines.

7. The view extrapolation method of claim 6, wherein the warping of the super-resolution EPI includes:

determining a pixel value of a first line of the super-resolution EPI as a pixel value of a first line of the warped super-resolution EPI; and determining the warped super-resolution EPI by propagating pixel values of each of lines of the warped super-resolution EPI to next lines in accordance with the disparity of each of the lines.

8. The view extrapolation method of claim 1, wherein the creating of an EPI mask includes creating a binary EPI mask in which the value of a coordinate of a pixel that is propagated in accordance with the disparity is 1 and values of coordinates of the other pixels are 0.

9. The view extrapolation method of claim 1, wherein the creating of an extrapolated image includes:

creating a plurality of sub-aperture images using the restored EPI; and determining any one of the plurality of sub-aperture images as the extrapolated image.

* * * * *